(12) United States Patent
Lee et al.

(10) Patent No.: US 9,469,336 B2
(45) Date of Patent: Oct. 18, 2016

(54) ARRANGEMENT OF ELECTRONIC STEERING ASSISTIVE DEVICE OF MULTIPURPOSE VEHICLE

(71) Applicant: KWANG YANG MOTOR CO., LTD., Kaohsiung (TW)

(72) Inventors: Yao-Chang Lee, Kaohsiung (TW); Tsung-Hsi Shih, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 14/740,291

(22) Filed: Jun. 16, 2015

(65) Prior Publication Data

US 2016/0052540 A1 Feb. 25, 2016

(30) Foreign Application Priority Data

Aug. 22, 2014 (TW) .............................. 103128921 A

(51) Int. Cl.
*B62D 5/04* (2006.01)

(52) U.S. Cl.
CPC .............. *B62D 5/0403* (2013.01); *B62D 5/04* (2013.01); *B62D 5/0409* (2013.01)

(58) Field of Classification Search
CPC ........................... B62D 5/0403; B62D 5/0409
USPC ........................................................ 180/444
See application file for complete search history.

(56) References Cited

U.S. PATENT DOCUMENTS

| | | | | |
|---|---|---|---|---|
| 7,438,147 B2* | 10/2008 | Kato | ...................... | B60K 17/34 180/68.1 |
| 7,497,299 B2* | 3/2009 | Kobayashi | ............... | B62D 1/16 180/444 |
| 7,497,471 B2* | 3/2009 | Kobayashi | ............... | B62D 1/16 180/311 |
| 7,665,571 B2* | 2/2010 | Kobayashi | ............... | B62D 1/16 180/444 |
| 7,900,743 B2* | 3/2011 | Kaku | ....................... | B62D 5/04 180/444 |
| 7,950,486 B2* | 5/2011 | Van Bronkhorst | .. | B60G 15/063 180/89.11 |
| 7,958,964 B2* | 6/2011 | Kobayashi | ............... | B62D 1/16 180/443 |
| 8,079,602 B2* | 12/2011 | Kinsman | .............. | B60G 15/063 280/5.512 |
| 8,177,008 B2* | 5/2012 | Yamamura | ............... | B62D 5/04 180/443 |
| 8,863,887 B2* | 10/2014 | Kii | ...................... | F16H 57/0489 180/339 |
| 2001/0007396 A1* | 7/2001 | Mizuta | ................... | B62D 25/10 296/193.11 |
| 2008/0023240 A1* | 1/2008 | Sunsdahl | ............. | B62D 21/183 180/68.2 |

* cited by examiner

*Primary Examiner* — Kevin Hurley
*Assistant Examiner* — Michael Stabley
(74) *Attorney, Agent, or Firm* — Leong C. Lei

(57) ABSTRACT

Disclosed is an arrangement of an electronic steering assistive device of a multipurpose vehicle. The multipurpose vehicle includes a frame unit that includes a pair of left and right side frames and a cross bar connected to the pair of left and right side frames. The cross bar includes a dashboard cover mounted to a side thereof facing a vehicle body rear end. The cross bar includes a steering mechanism mounted thereto. The steering mechanism includes an electronic motor based steering assistive device, which is arranged closely adjacent to the cross bar and in front of the dashboard cover so that the electronic motor based steering assistive device is kept away from a ground surface.

10 Claims, 5 Drawing Sheets

ARRANGEMENT OF ELECTRONIC STEERING ASSISTIVE DEVICE OF MULTIPURPOSE VEHICLE

TECHNICAL FIELD OF THE INVENTION

The present invention relates generally to an arrangement of an electronic steering assistive device of a multipurpose vehicle, and more particularly to an arrangement of an electronic steering assistive device of a multipurpose vehicle that protects the electronic steering assistive device from being stained and thus damaged by dust and mud on a ground surface.

Description of the Prior Art

As shown in FIG. 1, for operability of easy steering, a multipurpose vehicle, which is commonly used to travel on poor terrains, is often structured to incorporate an electronic motor based steering assistive device 11 with a steering mechanism 1. A steering connection bar 13 is arranged to couple a lower end of a steering column 12 of the steering mechanism 1 to a steering device 14. With the electronic motor based steering assistive device 11 properly installed, when the multipurpose vehicle changes direction, the steering connection bar 13 is caused to activate the operation of a motor 111 of the electronic motor based steering assistive device 11. The electronic motor based steering assistive device 11 uses the power generated by the electronic motor 111 to drive the steering device 14 coupled to the steering column 12 to move so as to achieve an effect of making steering of the multipurpose vehicle effortless and easy to operate.

As shown in FIG. 1, the electronic motor 111 of the electronic motor based steering assistive device 11 is arranged at an interconnection between the steering connection bar 13 and the steering device 14. In other words, the electronic motor based steering assistive device 11 is set at a lower location in a front side of the multipurpose vehicle and is thus readily stained and damaged by dust and mud from a ground surface. Thus, it is a challenge of the multipurpose vehicle industry to provide a structural arrangement of an electronic motor based steering assistive device.

SUMMARY OF THE INVENTION

The primary object of the preset invention is to provide an arrangement of an electronic steering assistive device of a multipurpose vehicle, which helps overcome the deficiency that an electronic motor based steering assistive device of a conventional multipurpose vehicle is arranged at an interconnection between a steering connection bar and a steering device of a steering mechanism so that the electronic motor based steering assistive device is readily stained and damaged by dust and mud from a ground surface.

To achieve the above object, a technical solution adopted is that an arrangement of an electronic steering assistive device of a multipurpose vehicle is provided. The multipurpose vehicle comprises a frame unit that comprises a pair of left and right side frames and a cross bar connected to the pair of left and right side frames. The cross bar comprises a dashboard cover mounted to a side thereof facing a vehicle body rear end. The cross bar comprises a steering mechanism mounted thereto. The steering mechanism comprises an electronic motor based steering assistive device. The electronic motor based steering assistive device is arranged closely adjacent to the cross bar and is located in front of the dashboard cover so that the electronic motor based steering assistive device is kept away from a ground surface.

An efficacy that the present invention may achieve with the above technical solution is that an electronic motor based steering assistive device is coupled to a steering column assembly of a steering mechanism and is mounted via a fixing member to a cross bar, so that the electronic motor based steering assistive device is arranged closely adjacent to the cross bar, whereby the electronic motor based steering assistive device is kept far away from a ground surface and is thus protected from staining caused by dust and mud from the ground surface and therefore, the effectiveness and the lifespan of the electronic motor based steering assistive device are improved.

Another efficacy of the present invention is that the electronic motor based steering assistive device is mounted on the cross bar and the electronic motor based steering assistive device is set at an altitude substantially corresponding to an air intake opening of an air filter, so that the electronic motor based steering assistive device is kept at a relatively high location in the multipurpose vehicle to reduce the chance that the electronic motor based steering assistive device is stained and damaged by dust and mud from a ground surface, whereby the operability, effectiveness, and lifespan of the electronic motor based steering assistive device are maintained.

A further efficacy of the present invention is that the electronic motor based steering assistive device is arranged under the cross bar and is located in a recessed portion formed in a lower side of the article storage box, so that the recessed portion may help prevent interference with parts of the electronic motor based steering assistive device and the steering mechanism, whereby the space delimited between the cross bar and the article storage box can be fully used and further, the electronic motor based steering assistive device is kept away from the ground surface and is protected from being stained by dust and mud from the ground surface so as to effectively improve the effectiveness and the lifespan of the electronic motor based steering assistive device.

A further efficacy of the present invention is that in a side elevational view of the multipurpose vehicle, a motor of the electronic motor based steering assistive device overlaps side frames and the motor is located below the cross bar so that the space between the two side frames and delimited between the cross bar and the article storage box can be fully used to make the entire arrangement of the multipurpose vehicle compact.

Yet a further efficacy of the present invention is that the electronic motor based steering assistive device is coupled to the steering column assembly of the steering mechanism and is mounted by a fixing member to the cross bar and is securely fixed by a mounting member of a retention seat so that the electronic motor based steering assistive device is arranged at a location closely adjacent to the cross bar to thereby facilitate the assembling of the electronic motor based steering assistive device.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
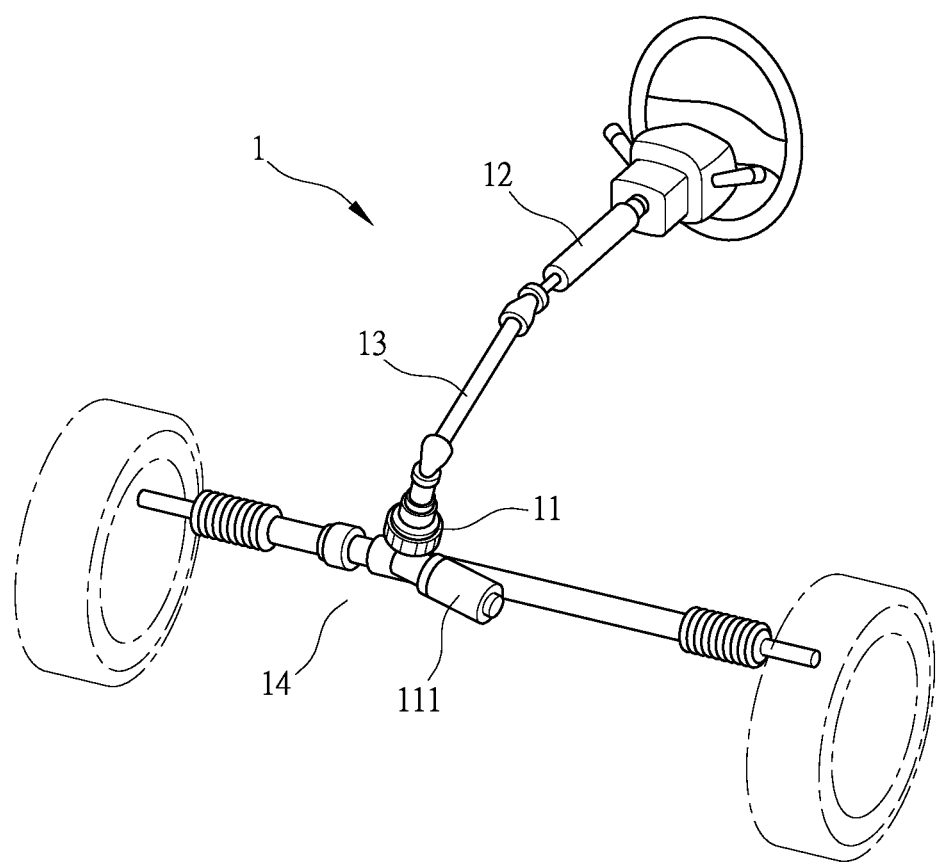
FIG. 1 is a schematic view showing an arrangement of an electronic motor based steering assistive device of a conventional multipurpose vehicle.
Figure 2:
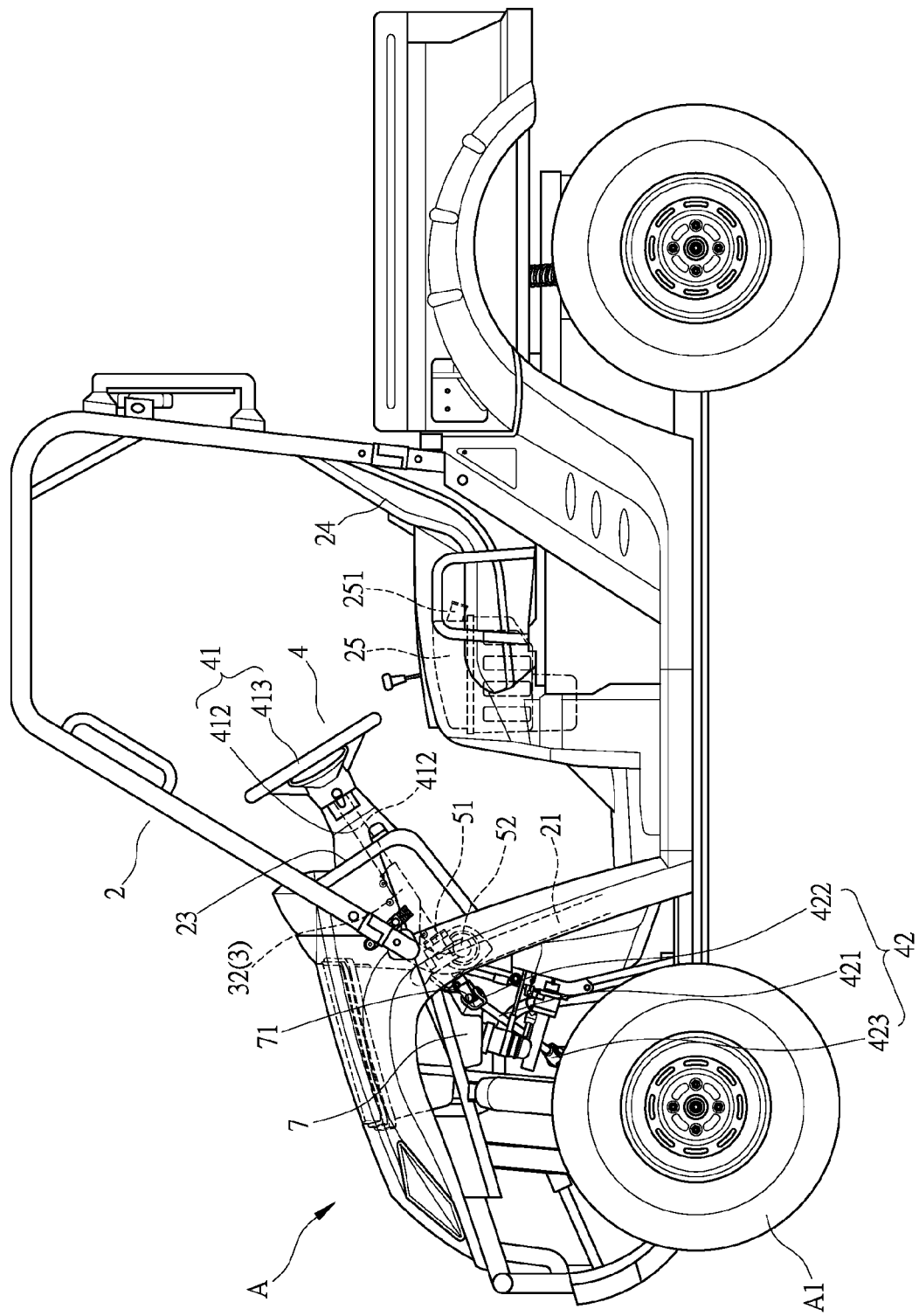
FIG. 2 is a side elevational view of a multipurpose vehicle according to the present invention.
Figure 3A:
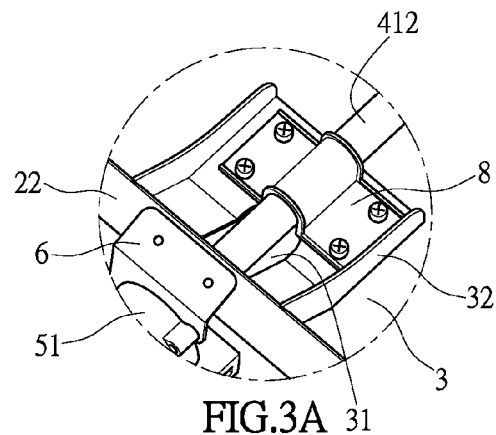
FIG. 3A is an enlarged view of a circled portion of FIG. 3.
Figure 3:
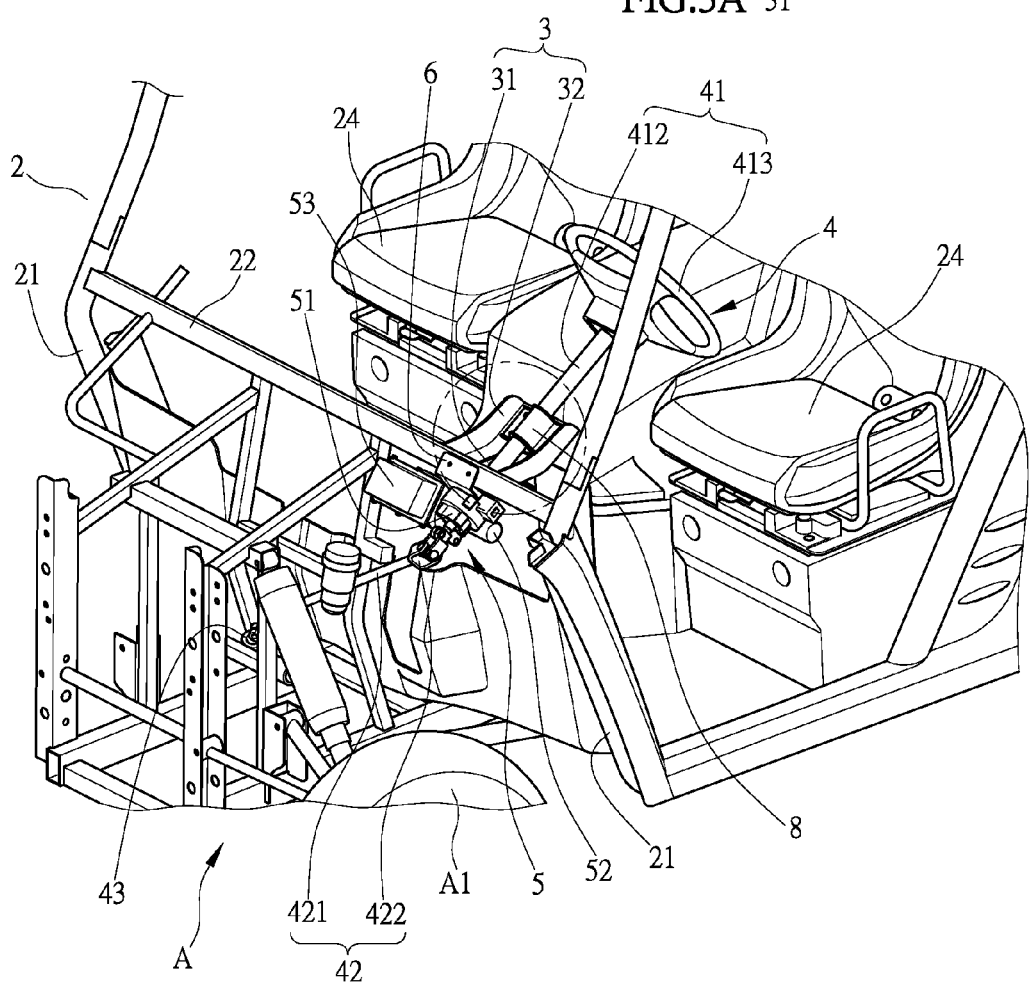
FIG. 3 is a schematic view showing an arrangement of an electronic motor based steering assistive device of the multipurpose vehicle according to the present invention.

Referring first to FIGS. 2 and 3, a multipurpose vehicle A comprises a frame unit 2, which comprises at least a pair of left and right side frames 21 and a cross bar 22 connected to the pair of side frames 21. The cross bar 22 is provided with a dashboard cover 23 mounted thereto to face a vehicle body rear end. At the side of the dashboard cover 23 that faces the vehicle body rear end, two seat sections 24 are provided and spaced from the dashboard cover 23. An air filter 25 is arranged between the two seat sections 24 to supply external fresh air for combustion conducted in a power unit (not shown). The air filter 25 comprises an air intake opening 251 that allows external fresh air to enter the air filter 25.

Figure 4:
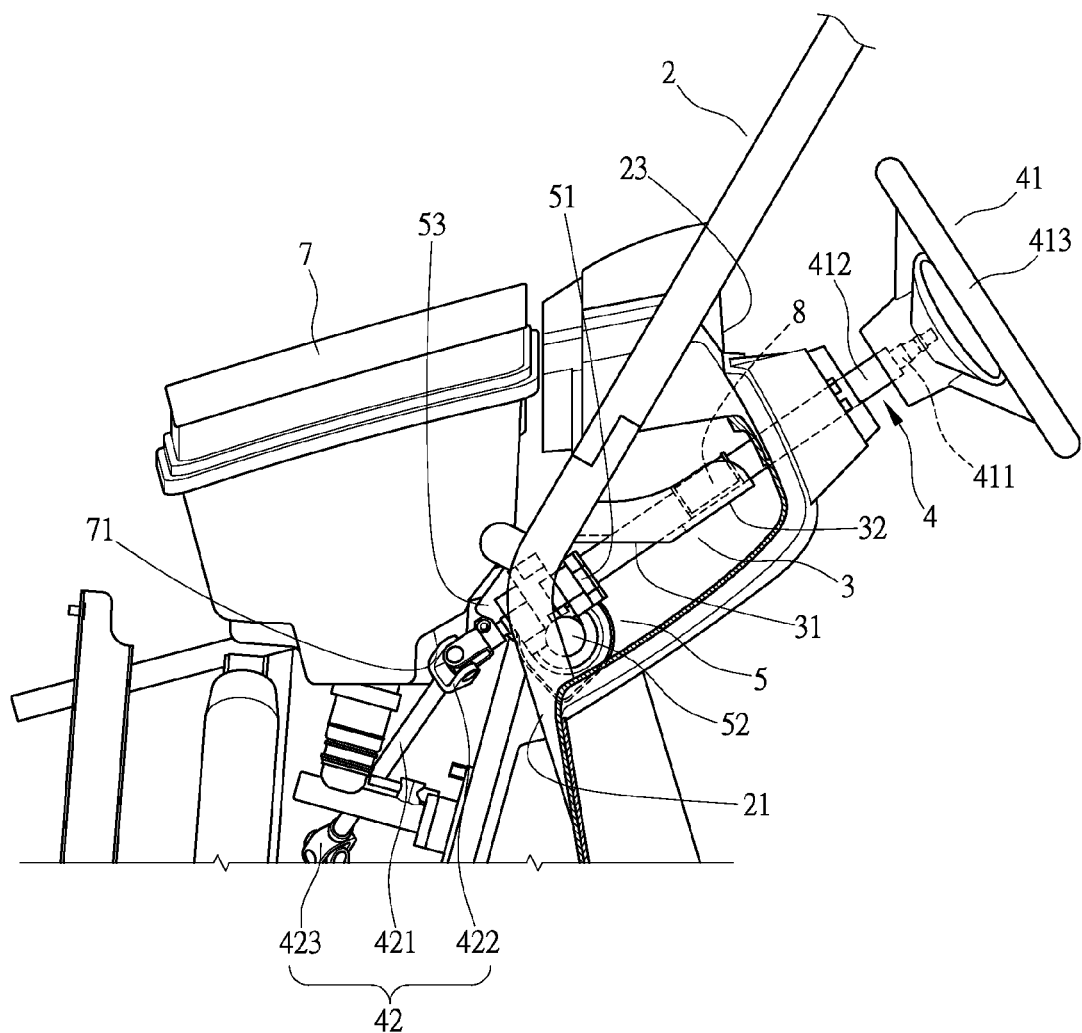
FIG. 4 is a side elevational view showing the arrangement of the electronic motor based steering assistive device of the multipurpose vehicle according to the present invention.

As shown in FIGS. 2, 3, and 4, the multipurpose vehicle A comprises a retention seat 3 mounted to the cross bar 22. The retention seat 3 comprises a through hole 31 and a mounting section 32. The mounting section 32 receives a mounting member 8 fixed thereto. The retention seat 3 supports a steering mechanism 4 mounted thereto.

Figure 5:
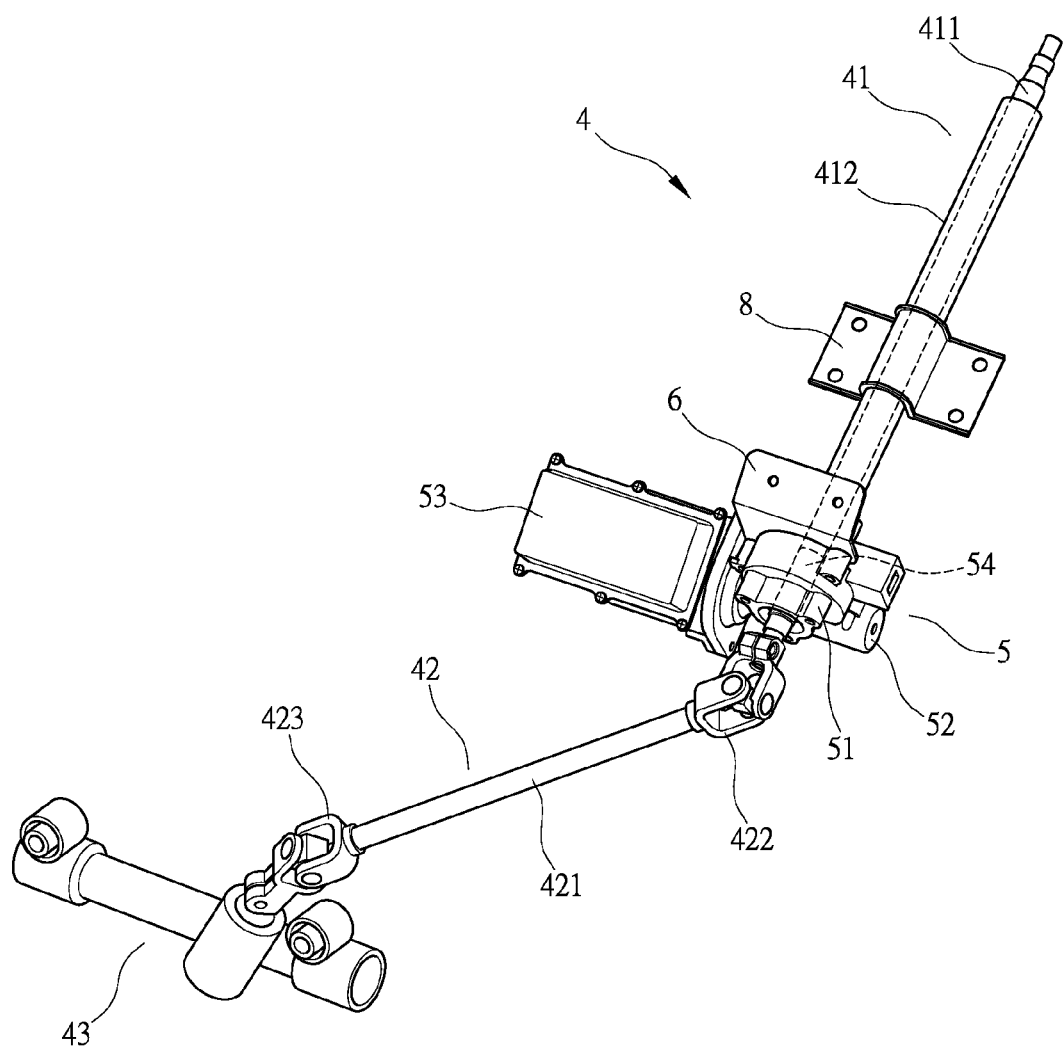
FIG. 5 is a schematic view illustrating assembly of the electronic motor based steering assistive device and a steering mechanism according to the present invention.

As shown in FIGS. 3, 4, and 5, the steering mechanism 4 comprises, in a sequence from top to bottom, a steering column assembly 41, a steering connection bar assembly 42, and a steering device 43. The steering column assembly 41 comprises a steering bar 411 and a steering tube 412, of which the steering bar 411 is received in and through the steering tube 412. The steering bar 411 has an end to which a steering wheel 413 is attached. The steering connection bar assembly 42 comprises a connection bar 421 and a first universal joint 422 and a second universal joint 423 respectively mounted to opposite ends of the connection bar 421. The steering device 43 is coupled to the steering connection bar assembly 42. The steering device 43 has two lateral ends that are respectively coupled to and controlling front wheels A1 of the multipurpose vehicle A. The steering column assembly 41 of the steering mechanism 4 comprises an electronic motor based steering assistive device 5 mounted and coupled thereto.

As shown in FIGS. 3, 4, and 5, the electronic motor based steering assistive device 5 comprises a main body 51, a motor 52, a controller 53, and a rotary bar 54 arranged inside the main body 51. The main body 51 comprises a fixing member 6 securely attached thereto. The steering bar 411 of the steering column assembly 41 of the steering mechanism 4 is coupled to an upper end of the rotary bar 54 of the electronic motor based steering assistive device 5. The steering tube 412 of the steering column assembly 41 of the steering mechanism 4 is fixed to an upper end of the main body 51 of the electronic motor based steering assistive device 5. A lower end of the rotary bar 54 of the electronic motor based steering assistive device 5 is coupled to the first universal joint 422 of the steering connection bar assembly 42 of the steering mechanism 4 and the second universal joint 423 on the opposite end of the steering connection bar assembly 42 is coupled to the steering device 43. The motor 52 and the controller 53 are arranged beside the main body 51.

As shown in FIGS. 3 and 4, the multipurpose vehicle A comprises an article storage box 7 mounted to the side of the cross bar 22 that faces towards a vehicle body front end. The article storage box 7 comprises a recessed portion 71 that is formed by recessing a side thereof facing the vehicle body rear end.

As shown in FIGS. 3, 4, and 5, the steering mechanism 4 of the multipurpose vehicle A is securely mounted to the cross bar 22. The steering mechanism 4 is arranged so that the steering column assembly 41 extends through the through hole 31 of the retention seat 3 of the cross bar 22 and a mounting member 8 retains and securely fixes the steering column assembly 41 on the mounting section 32 of the retention seat 3. Further, the fixing member 6 that is attached to the electronic motor based steering assistive device 5 is securely mounted to the cross bar 22 so that the steering mechanism 4 is securely fixed at two fixing sites including the mounting member 8 and the fixing member 62 and thus, an effect of securely positioning the steering mechanism 4 on the cross bar 22 can be achieved and the assembling of the electronic motor based steering assistive device 5 is made easy.

As shown in FIGS. 3 and 4, since the electronic motor based steering assistive device 5 is coupled to the steering column assembly 41 of the steering mechanism 4 and is mounted to the cross bar 22 by the fixing member 6, the electronic motor based steering assistive device 5 is arranged at a location that is closely adjacent to the cross bar 22 and in front of the dashboard cover 23. More specifically, the electronic motor based steering assistive device 5 is arranged below the cross bar 22 and is located in the recessed portion 71 formed in a lower side of the article storage box 7, wherein the recessed portion 71 provides a space for avoiding interference with parts of the electronic motor based steering assistive device 5 (such as the controller 53) and parts of the steering mechanism 4 (such as the first universal joint 422). With such an arrangement, the electronic motor based steering assistive device 5 is kept away from a ground surface and is thus protected from being stained by dust and mud from the ground surface. Further, in a side elevational view of the multipurpose vehicle A, the motor 52 of the electronic motor based steering assistive device 5 overlaps the side frames 21 and the motor 52 is located below the cross bar 22. With such an arrangement, a space delimited between the two side frames 21 and between the cross bar 22 and the article storage box 7 can be fully used to make the entire arrangement of the multipurpose vehicle A compact.

As shown in FIGS. 2 and 4, the electronic motor based steering assistive device 5 is coupled to the steering column assembly 41 of the steering mechanism 4 and is mounted to the cross bar 22 by the fixing member 6. In other words, the electronic motor based steering assistive device 5 is arranged on the cross bar 22 such that the electronic motor based steering assistive device 5 is set at an altitude that is substantially corresponding to the air intake opening 251 of the air filter 25. It is generally known that when the air intake opening 251 of the air filter 25 is flooded with water, the multipurpose vehicle A would no longer work. Thus, to ensure normal operation of the multipurpose vehicle A in traveling through a flooded area, the air intake opening 251 of the air filter 25 is generally set at a higher location in the multipurpose vehicle A. As such, the electronic motor based steering assistive device 5 being set at an altitude substantially corresponding to the air intake opening 251 of the air filter 25 would ensure the electronic motor based steering assistive device 5 being set at a higher location in the multipurpose vehicle A and reduce the chance of the electronic motor based steering assistive device 5 being stained and damaged by dust and mud from the ground surface, whereby the operability, effectiveness, and the lifespan of the electronic motor based steering assistive device 5 can be maintained.

The efficacy of the present invention is that the electronic motor based steering assistive device 5 is coupled via the steering column assembly 41 to the steering mechanism 4 and is mounted via the fixing member 6 to the cross bar 22, so that the electronic motor based steering assistive device 5 is arranged closely adjacent to the cross bar 22, whereby the electronic motor based steering assistive device 5 is kept far away from a ground surface and is thus protected from staining and damage caused by dust and mud from the ground surface and therefore, the effectiveness and the lifespan of the electronic motor based steering assistive device 5 are improved.

Another efficacy of the present invention is that the electronic motor based steering assistive device 5 is mounted on the cross bar 22 and the electronic motor based steering assistive device 5 is set at an altitude substantially corresponding to the air intake opening 251 of the air filter 25, so that the electronic motor based steering assistive device 5 is kept at a relatively high location in the multipurpose vehicle A to reduce the chance that the electronic motor based steering assistive device 5 is stained and damaged by dust and mud from a ground surface, whereby the operability, effectiveness, and lifespan of the electronic motor based steering assistive device 5 are maintained.

A further efficacy of the present invention is that the electronic motor based steering assistive device 5 is arranged under the cross bar 22 and is located in the recessed portion 71 at a lower side of the article storage box 7, so that the recessed portion 71 may help prevent interference with parts of the electronic motor based steering assistive device 5 (such as the controller 53) and pars of the steering mechanism 4 (such as the first universal joint 422), whereby the space delimited between the cross bar 22 and the article storage box 7 can be fully used and further, the electronic motor based steering assistive device 5 is kept away from the ground surface and is protected from being stained by dust and mud from the ground surface so as to effectively improve the effectiveness and the lifespan of the electronic motor based steering assistive device 5.

A further efficacy of the present invention is that in a side elevational view of the multipurpose vehicle A, the motor 52 of the electronic motor based steering assistive device 5 overlaps the side frames 21 and the electronic motor based steering assistive device 5 is located below the cross bar 22 so that the space between the two side frames 21 and delimited between the cross bar 22 and the article storage box 7 can be fully used to make the entire arrangement of the multipurpose vehicle A compact.

Yet a further efficacy of the present invention is that the electronic motor based steering assistive device 5 is coupled to the steering column assembly 41 of the steering mechanism 4 and is mounted by the fixing member 6 to the cross bar 22 and is securely fixed by the mounting member 8 of the retention seat 3 so that the electronic motor based steering assistive device 5 is arranged at a location closely adjacent to the cross bar 22 to thereby facilitate the assembling of the electronic motor based steering assistive device.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. An arrangement of an electronic steering assistive device of a multipurpose vehicle, the multipurpose vehicle comprising a frame unit that comprises a pair of left and right side frames and a cross bar connected to the pair of left and right side frames, the cross bar comprising an article storage box mountd to a side thereof facing a vehicle body front end, the article storage box being recessed in a side thereof facing the vehicle body rear end to form a recessed portion, the cross bar comprising a dashboard cover mounted to a side thereof facing a vehicle body rear end, the cross bar comprising a steering mechanism mounted thereto, the steering mechanism comprising an electronic motor based steering assistive device, the electronic motor based steering assistive device comprising a main body, a motor, a controller, and a rotary bar arranged inside the main body, characterized in that the electronic motor based steering assistive device is arranged closely adjacent to the cross bar and is located in front of the dashboard cover so that the electronic motor based steering assistive device is kept away from a ground surface, the recessed portion of the article storage box preventing interference with the controller of the electronic motor based steering assistive device and a first universal joint of the steering mechanism.

2. The arrangement of the electronic steering assistive device of the multipurpose vehicle according to claim 1, wherein two seat sections are arranged rearward of and spaced from the dashboard cover, an air filter being arranged between the two seat sections, the air filter comprising an air intake opening, the electronic motor based steering assistive device being at an altitude substantially corresponding to the air intake opening.

3. The arrangement of the electronic steering assistive device of the multipurpose vehicle according to claim 1, wherein the steering mechanism comprises, in sequence from top to bottom, a steering column assembly, a steering connection bar assembly, and a steering device, the electronic motor based steering assistive device being coupled to the steering column assembly of the steering mechanism.

4. The arrangement of the electronic steering assistive device of the multipurpose vehicle according to claim 3, wherein the steering column assembly comprises a steering bar and a steering tube, the steering bar being received in the steering tube, the steering bar having an end to which a steering wheel is attached, the steering bar having an opposite end coupled to an upper end of the rotary bar of the electronic motor based steering assistive device, the steering tube being mounted on the main body of the electronic motor based steering assistive device.

5. The arrangement of the electronic steering assistive device of the multipurpose vehicle according to claim 3, wherein the steering connection bar assembly comprises a connection bar and a first universal joint and a second universal joint respectively mounted to two ends of the connection bar, the first universal joint being coupled to a lower end of the rotary bar of the electronic motor based steering assistive device, the second universal joint being coupled to the steering device.

6. The arrangement of the electronic steering assistive device of the multipurpose vehicle according to claim 1, wherein the cross bar comprises a retention seat, the retention seat comprising a through hole and a mounting section, the mounting section receiving a mounting member mounted thereto, the steering mechanism comprising at least a steering column assembly, the electronic motor based steering assistive device being mounted to the steering column assembly of the steering mechanism, the steering column assembly extending through the through ole of the retention seat and mounted by the mounting member to the mounting section of the retention seat, the electronic motor based steering assistive device comprising a main body to which a fixing member is attached, the fixing member being fixed to the cross bar.

7. The arrangement of the electronic steering assistive device of the multipurpose vehicle according to claim 1, wherein in a side elevational view of the multipurpose vehicle, the motor of the electronic motor based steering assistive device overlaps the side frames and the electronic motor based steering assistive device is located below the cross bar.

8. The arrangement of the electronic steering assistive device of the multipurpose vehicle according to claim 1, wherein the steering mechanism comprises, in sequence from top to bottom, a steering column assembly, a steering connection bar assembly, and a steering device, the electronic motor based steering assistive device being coupled to the steering column assembly of the steering mechanism.

9. The arrangement of the electronic steering assistive device of the multipurpose vehicle according to claim 8, wherein the steering column assembly comprises a steering bar and a steering tube, the steering bar being received in the steering tube, the steering bar having an end to which a steering wheel is attached, the steering bar having an opposite end coupled to an upper end of the rotary bar of the electronic motor based steering assistive device, the steering tube being mounted on the main body of the electronic motor based steering assistive device.

10. The arrangement of the electronic steering assistive device of the multipurpose vehicle according to claim 8, wherein the steering connection bar assembly comprises a connection bar and a first universal joint and a second universal joint respectively mounted to two ends of the connection bar, the first universal joint being coupled to a lower end of the rotary bar of the electronic motor based steering assistive device, the second universal joint being coupled to the steering device.

* * * * *